United States Patent [19]

Ceccato et al.

[11] 3,920,620

[45] Nov. 18, 1975

[54] CURABLE COMPOSITIONS BASED ON ELASTOMERIC VINYLIDENE FLUORIDE COPOLYMERS, PROCESS FOR CURING THE COMPOSITIONS, AND THE CURED COMPOSITIONS

[75] Inventors: Giovanni Ceccato; Sergio Geri, both of Milan; Luigi Colombo, Busto Arsizio, all of Italy

[73] Assignee: Montedison S.p.A., Milan, Italy

[22] Filed: Oct. 5, 1973

[21] Appl. No.: 403,826

[30] Foreign Application Priority Data

Oct. 9, 1972  Italy .................................. 30245/72

[52] U.S. Cl... 260/79.5 C; 117/122 R; 117/132 CF; 161/218; 260/80.77; 260/87.7

[51] Int. Cl.² .................. C08F 28/00; C08F 214/00

[58] Field of Search ............ 260/79.5 C, 80.77, 87.7

[56] References Cited

UNITED STATES PATENTS

| | | | |
|---|---|---|---|
| 3,502,628 | 3/1970 | Barney et al. | 260/80.77 |
| 3,580,889 | 5/1971 | Barney et al. | 260/80.77 |
| 3,655,727 | 4/1972 | Patel et al. | 260/80.77 |
| 3,712,877 | 1/1973 | Patel et al. | 260/80.77 |
| 3,761,454 | 9/1973 | Geri et al. | 260/80.77 |

*Primary Examiner*—Ronald W. Griffin

[57] ABSTRACT

There are disclosed new curable compositions based on saturated linear and elastomeric copolymers of vinylidene fluoride with one or more fluorinated or chlorofluorinated, ethylenically unsaturated monomers of the type of 1-hydropentafluoropropene. A method of curing the compositions is also disclosed.

11 Claims, No Drawings

CURABLE COMPOSITIONS BASED ON ELASTOMERIC VINYLIDENE FLUORIDE COPOLYMERS, PROCESS FOR CURING THE COMPOSITIONS, AND THE CURED COMPOSITIONS

Cured elastomers based on vinylidene fluoride copolymers are well-known and are extensively used in several different fields of application, due to their high thermal stability and good resistance to a large number of fuels, lubricants, solvents and similar materials, even at a high temperature.

Said cured products are, in theory, particularly useful as seals, both static and dynamic, in the motor, mechanical, chemical, aeronautical and naval fields, as protective clothing for contact with aggressive chemical agents, and as sheaths for electric cables which are exposed to strong thermal radiations.

A problem is that the processes so far known for curing vinylidene fluoride elastomeric copolymers are mainly based on the use of polyamine derivatives, which generally do not exercise a good curing action and do not impart such good characteristics as are demanded to meet the requirements of practical use. A poor ageing resistance at high temperatures and an insufficient resistance to permanent deformation under compression (compression set) for long periods, especially at higher temperatures, are the most severe handicaps to the practical use of the thus cured elastomers.

It is very important to obtain cured products from fluorinated elastomers showing good mechanical properties, and first among these are the resistance to permanent deformation under compression (compression set) for rather long periods of time over a wide range of temperatures, and a high stability to thermal ageing, at temperatures as high as 275°C and higher.

Adequately cured fluorinated elastomers can have many advantages in a broad field of applications, for example, as seals, both static and dynamic, to retain fluids of various kinds under pressure at even high temperatures. In practical use in such applications, the cured fluorinated elastomer is compressed continuously for long periods of time. If, in such application, the cured article undergoes a permanent deformation due to compression, the tightness of the seal is seriously compromised and, as a consequence, fluid is lost.

This drawback is all the more evident, the higher the temperature, and the longer the time during which the cured fluorinated elastomer is compressed.

It is equally important that in sealing applications in general, the cured articles derived from vinylidene fluoride copolymers show such adequate chemical resistance as is commonly required for the class of fluorinated elastomers.

Therefore, one object of this invention is to provide new curable compositions based on vinylidene fluoride elastomeric copolymers and free from the above mentioned drawbacks.

Another object is to provide a process for curing compositions based on vinylidene fluoride elastomeric copolymers, which is also free from the above-mentioned drawbacks.

A third object is to provide cured compositions based on vinylidene fluoride elastomeric compositions and free from the above mentioned drawbacks.

These and other objects which will become apparent hereinafter are achieved by providing curable compositions which contain:

I. 100 parts by weight of a saturated, linear, elastomeric copolymer of vinylidene fluoride with one or more fluorinated or chloro-fluorinated, ethylenically unsaturated monomers such as e.g., 1-hydropentafluoropropene; 2-hydropentafluoropropene; 1,1-dihydrotetrafluoropropene, hexafluoropropene, tetrafluoroethylene, trifluorochloroethylene and the like;

II. 1–40 parts by weight of an inorganic acids acceptor consisting of one or more basic oxides of bivalent metals selected from the group including magnesium oxide, calcium oxide, lead monoxide, zinc oxide and/or one or more lead basic phosphites, optionally in the form of cationic complexes or chelates;

III. 0.5–10 parts by weight of one or more basic compounds selected from the group including calcium, strontium and barium hydrates, the metal salts of weak acids like carbonates, benzoates and calcium, strontium, barium, sodium and potassium phosphates, optionally in the form of complexes with the normal cationic chelating or complexing agents of the type well-known to those skilled in the art; and, in accordance with this invention;

IV. 0.5–15 parts by weight of a curing agent based on one or more polyhydroxy and/or polythiol compounds having the general formulas:

$$A(XY)_n \text{ or } YX - R^* - YX$$

wherein $A$ is an arylene radical; $n$ is an integer higher than or equal to 2; $X$ is $O$ or $S$; $Y$ is hydrogen and/or an alkali metal; $R^*$ is an alkylene, cycloalkylene, mono or polyalkylenaryl, mono or polyalkylencycloalkyl or alkylen diarylene radical, such as for example: polyphenols and more particularly hydroquinone, resorcinol, catechol, naphthols, bisphenols and their derivatives containing in the aromatic ring and/or in the aliphatic group ($R^*$ = alkyl endiarylene) substituents other than hydrogen and more particularly halogens such as chlorine and fluorine; lower aliphatic and cycloaliphatic diols like 1,4-butandiol; dialkylene cycloaliphatic diols like 1,4-dihydroxymethylene cyclohexane, dialkylenaromatic diols like 1,4-dihydroxymethylene-benzene and the corresponding thiol derivatives and the alkali metal salts of all the above cited compounds; in combination with V. 0.05–5 parts by weight of a curing accelerator based on a hydrate or salt of cations of the type indicated by (A), (B) and (C):

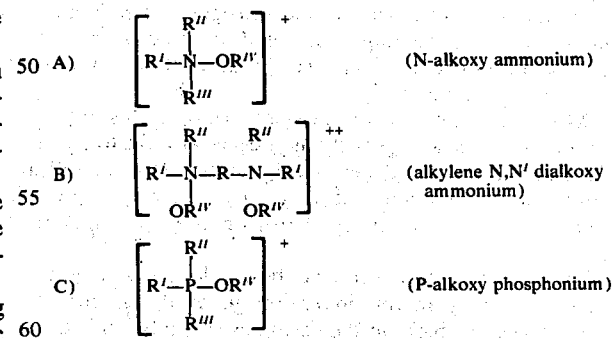

A) (N-alkoxy ammonium)

B) (alkylene N,N' dialkoxy ammonium)

C) (P-alkoxy phosphonium)

wherein $R'$, $R''$ and $R'''$, which may be the same or different, may be alkyl, cycloalkyl, aryl, alkylene aryl, oxyalkyl or polyoxyalkyl groups with the end group OH either free or etherified, containing from 1 to 18 and preferably from 1 to 12 carbon atoms; —CH= groups belonging to aromatic or heteroaromatic rings; or —CM$_2$ —groups belonging to cycloaliphatic or heterocycloaliphatic rings; $R^{IV}$ may be hydrogen, an alkyl oxyalkyl or polyoxyalkyl group with the end group OH either free or etherified; finally R may be an alkylene, cycloalkylene or dialkylene cycloalkyl group containing from 2 to 18 carbon atoms, or a dialkylarylene group containing from 8 to 12 carbon atoms; with organic and inorganic anions such as halides, oxalates, formates, stearates, benzoates and the like.

The curable compositions of the invention are cured according to a process which is also an object of this invention and which consists in first heating said compositions under pressure, at temperatures ranging from 130° to 200°C, preferably from 160° to 200°C, for a time from 1 to 60 and preferably from 1 to 20 minutes; and subsequently, post-vulcanizing the articles thus obtained in a furnace or oven, under atmospheric pressure, at temperatures comprised between 130° and 315°C, preferably between 200° and 275°C for a time ranging from 5 to 48 and preferably from 10 to 24 hours.

It has been found, surprisingly, that the curable compositions according to this invention can be transformed into articles of any shape and size, by extrusion molding and subsequent vulcanization or by molding and simultaneous curing, adopting even highly automatized injection technologies.

Said articles show an excellent resistance to permanent deformation under compression (compression set) a minimum tendency to scorching, depending on storing time and temperature or on the temperatures of particular processing technologies, such as for example extrusion, and moreover a high resistance to thermal ageing. The se articles can also be coupled with metallic substrates, to which they show an exceptional adhesion even at high temperatures, for instance above 250°C.

It has also been found that the curable compositions containing the additives from (I) to (V) above do not cause stickiness or soiling of the molds, so that discards are practically non-existent, thus insuring high production standards and very regular processing cycles.

The process according to this invention is particularly effective for use with compositions comprising copolymers containing from 30 to 70 mols % of vinylidene fluoride and/or more 70 to 30 mol % of 1-hydropentafluoropropene or hexafluoropropene or vinylidene fluoride/tetrafluoroethylene/hexafluoropropene and/or 1-hydropen tafluoropropene terpolymers in which the percentages of the three monomers are comprised between 40 and 80, 30 and 10 and 30 and 10 mols %, respectively.

More generally, the process according to this invention may be advantageously applied to any elastomeric fluorinated saturated polymeric material, optionally containing substituents other than fluorine and chlorine, and also to mixtures of two or more fluorinated elastomers.

The preferred compounds to be employed as accelerators according to this invention generally consist of derivatives in which, in the formulas (A), (B) and (C), $R^I$ and $R^{II}$ are identical and represent —$CH_2$— groups both belonging to a cycloaliphatic or heterocycloaliphatic ring such as for instance the piperidine ring, and $R^{III}$ and $R^{IV}$, identical as well, represent a $CH_3$ group, or $R^I$, $R^{II}$ and $R^{III}$ either identical or different represent alkyl or cycloalkyl radicals containing up to 12 carbon atoms, $R^{IV}$ an alkyl radical with a low number of carbon atoms and preferably methyl or ethyl, R is an alkylene radical containing from 2 to 8 carbon atoms, and the anions are halides such as chloride, fluoride, bromide and iodide, or of an organic type such as oxalate, formiate, stearate, benzoate and the like.

These compounds may be prepared starting from aliphatic, cycloaliphatic, heterocycloaliphatic, aromatic and heterocycloaromatic tertiary monoamines and diamines or from derivatives of hydroxylamine according to methods known in the art.

The quantity of accelerator to be used in the process according to this invention, although remaining within the limits stated above, depends on the solubility of the additive in the fluorinated elastomer, on whether steric impediments are present in the additive, on the degree of basicity of the curable composition and on many other factors bound to the other particular additives used, on the type, shape and size of the article to be prepared, on the curing conditions and on the system and nature of heating during the curing.

The curable compositions according to this invention may contain, in addition to the substances (I) to (V) mentioned above, carbon black, white and colored fillers, known plastifying and lubricating agents like stearates, aryl phosphates, polyethers, polyesters, polyethylene and other known additives according to the technologies commonly adopted by the users of fluorinated elastomers.

The components of the curable compositions according to this invention are easy to incorporate into the vinylidene fluoride elastomeric copolymer, either separately or pre-mixed, or can be solubilized in solvents and then caused to be adsorbed on inert fillers with a large superficial area, without any undesired secondary phenomenon such as superficial efflorescence caused by phenomena of internal migration within the curable composition.

In this way, it is possible to reach good curing rates at the normal processing temperatures, without however incurring the risk of scorching (pre-curing) in the preliminary processing stages preceding the actual curing operation.

Finally, another advantage according to this invention consists in the complete elimination of the undesired "flash shrinkage" phenomena in the closed mold and pressure curing of fluorinated elastomer articles under pressure particularly in the case of O-Ring seals.

In a preferred embodiment of the process according to this invention, the mixture of accelerator (0.1–1.2 parts by weight) and curing agent(1–6 parts by weight) is added to the fluorinated elastomer (100 parts by weight) before the addition of the acid acceptor (2–10 parts by weight), of the basic compounds (3–7 parts by weight), of the reinforcing and inert fillers, of the lubricants, plastifiers and of other possible additives.

When operating in this manner, the curing is achieved rapidly in a controlled and uniform way, without any risk of undesired phenomena, like scorching during the various processing steps of the mix or during storage thereof. Similarly, any risk of loss due to volatilization during the preparation and preservation of the curable compositions is avoided; moreover, no special precautions are required on the part of the personnel attending the operations.

The cured elastomers obtained from the compositions according to this invention are usefully applied as seals, both static and dynamic, in the motor, mechanical and naval fields, as protective clothing for contact with corrosive chemical agents and as sheaths for electric cables, to be exposed to strong thermal radiations.

The following examples are given to illustrate the invention and are not intended to be limiting.

EXAMPLE 1

100 g of 95% N-methylpiperidine (0.95 mol) were put into a 400 ml glass flask and then 125 cc of anhydrous methyl alcohol were added. 113 g of $H_2O_2$ at 30% by weight (1.0 mol at 100% of $H_2O_2$) were added in 30 minutes under mild stirring to the methanol solution of N-methylpiperidine, while cooling the flask with a water circulation bath, in order to prevent increase in the temperature above 25°C. After 2 hours, an excess of 34 g of $H_2O_2$ at 30% by weight (0.33 mol of 100% $H_2O_2$) was added. The course of the reaction was followed with a pH-meter equipped with a calomel reference electrode. The reaction was completed in 24 hours with change in the pH from an initial value of more than 12 to a value of 8.4.

The excess of $H_2O_2$ was destroyed in situ using a palladium catalyst supported on an inert material.

After removal of the palladium catalyst by filtration, the filtrate was distilled under a residual pressure of 2 mm Hg at 40°C to completely remove methyl alcohol and water; 145 g of a liquid product were obtained which, upon NMR analysis, appeared to consist of N-methylpiperidine N-oxide.

135 g of the thus obtained product were reacted in a glass flask provided with a thermometer, a stirrer, a reflux cooler and a dropping fuinnel, with 152 g of $CH_3I$ (1.07 mol) at a temperature of 42°C($CH_3I$ reflux temperature) for 2 hours.

After removal of the excess methyl iodide by distillation under a residual pressure of 40 mm Hg, at a temperature of 45°C, 195 g of a liquid product were obtained, which upon analysis appears to consist of N-methoxy-N-methylpiperidinium iodide.

The data contained in Table A illustrate the efficient crosslinking action of curing systems for fluorinated elastomers containing N-methoxy-N-piperidinium iodide. The blends used for these runs consisted of 100 parts by weight of fluorinated elastomer composed of a vinylidene fluoride/1-hydropentafluoropropene copolymer, in a molar ratio of 4/1, having a Mooney ML viscosity (1 +4) at 100°C = 75 and a specific weight at 25°C of 1.816 g/ml (commercial product known as "Tecnoflon SL" of Montedison S.p.A. — Milan), of 5 parts by weight of magnesium oxide with a high superficial activity, of 30 parts by weight of carbon black MT, of 5 parts by weight of $Ca(OH)_2$, of 1.2 parts by weight of hydroquinone and of variable quantities of N-methoxy-N-methylpiperidinium iodide.

The N-methoxy-N-methylpiperidinium iodide was absorbed on calcium silicate at 60% by weight, then mixed with hydroquinone and subsequently incorporated into the crude elastomer, in a mixer provided with water circulation cooled cylinders, i.e. before incorporating the other components of the blend. Four blends were thus prepared which were subsequently cured for 5 minutes at 170°C under pressure and then postcured in an oven with circulation and renewal of air, at 250°C for 20 hours, plus a gradual rise in temperature from 100° to 250°C in 5 hours. From the comparison of the compression set data, Mooney scorching data and the mechanical properties contained in Table A, it is apparent that run (1) [blend without the N-methoxy-N-methylpiperidinium iodide accelerator] does not cure, while run (3) gives results which are better than those of the runs (2) and (4), in particular for the lower compression set figures obtained.

TABLE A

| Components of the blend | (1) | (2) | (3) | (4) |
| --- | --- | --- | --- | --- |
| Tecnoflou SL | 100 | 100 | 100 | 100 |
| MgO (Maglite D) | 5 | 5 | 5 | 5 |
| Carbon black MT | 30 | 30 | 30 | 30 |
| Ca(OH)$_2$ | 5 | 5 | 5 | 5 |
| Hydroquinone | 1.2 | 1.2 | 1.2 | 1.2 |
| N-methoxy N-methylpiperidinium Iodine | — | 0.3 | 0.5 | 0.85 |
| Thermo-mechanical characteristics | | | | |
| Viscosity Mooney MS, at 121°C(1) Minimum | 28 | 31 | 33 | 36 |
| Minutes for 10 points increase | 45 | 42 | 37 | 30 |
| 100% elongation modulus, kg/cm$^2$(2) | —(*) | 32 | 56 | 89 |
| Tensile stress, kg/cm$^2$(2) | — | 110 | 135 | 125 |
| Elongation at break, .%(2) | — | 295 | 185 | 115 |
| Hardness, IRHD(3) | — | 67 | 69 | 74 |
| Compression set, O-Rings (25.4 mm × 3.53 mm) | | | | |
| 200°C for 70 hours(4) | — | 26 | 20 | 30 |
| 200°C for 168 hours(4) | — | 39 | 33 | 44 |

(*)Samples showing blisters and not cured
(1)Determined according to ASTM D 1646-63 using a small-sized rotor
(2)Determined according to ASTM D 412-62 T on 2 mm thick samples
(3)Determined according to ASTM D 1415-68 on 6 mm thick samples, reading after 30"
(4)Determined according to ASTM D 395-61 - method B -

EXAMPLE 2

65 g of moist AgOH(0.52 mols) and 200 ml of distilled $H_2O$ were fed into a 1,000 ml glass flask. 130 g of N-methoxy-N-methylpiperidinium iodide (0.5 mol) prepared according to the modalities described in Example 1 were then added gradually under vigorous stirring in 15 minutes at room temperature.

The course of the reaction was determined by the argentometric method. After having removed the excess of AgOH and solid AgI formed by filtration, water was removed from the filtrate by distillation. 74 g of a liquid product were obtained which, upon analysis, appeared to be N-methoxy-N-methylpiperidinium hydrate. From 4 portions of 20 grams (136 millimols) each of N-methoxy-N-methylpiperidinium hydrate prepared as described above, 21.2 g of oxalate, 20.4 g of acetate, 19.7 g of formiate and 21.9 g of N-methoxy-N-methylpiperidinium propionate, respectively, were obtained by known methods.

Said N-methoxy-N-methylpiperidinium compounds were used as curing accelerators of TEcnoflon SL blends in combination with hydroquinone in a weakly basic medium. The preparation of the blends and curing was carried out according to the same modalities as those described in Example 1.

The accelerator used in the mixes was therefore:
blend 3 N-methoxy-N-methylpiperidinium iodide
blend 5 N-methoxy-N-methylpiperidinium hydrate
blend 6 N-methoxy-N-methylpiperidinium oxalate
blend 7 N-methoxy-N-methylpiperidinium acetate
blend 8 N-methoxy-N-methylpiperidinium formiate
blend 9 N-methoxy-N-methylpiperidinium propionate in quantities corresponding molecularly to that of N-methoxy-N-methylpiperidinium iodide of blend 3. The following Table B summarizes the results obtained in curing the above mentioned blends.

The Mooney scorching resistance appears to be high for all of the blends considered, while the curing rate appears to be a function of the particular N-methoxy-N-methylpiperidinium salt employed. The blend of run (9) appears to have a high curing rate, clearly higher than that of the blends (3) and (5).

The compression set figures of all blends are very interesting, in particular those relating to blends (8) and (9) wherein, after conditioning the O-Rings samples at 200°C × 70 hours, figures of about 15% are obtained.

The determinations were made as stated in the notes of Table A.

The ODR determination was made according to ASTM D-2705-68 T, using an oscillating disk rheometer (biconical disk).

TABLE B

| Components of the blend | (3) | (5) | (6) | (7) | (8) | (9) |
|---|---|---|---|---|---|---|
| Tecnoflou SL. | 100 | 100 | 100 | 100 | 100 | 100 |
| Magnesium oxide | 5 | 5 | 5 | 5 | 5 | 5 |
| Carbon black MT | 30 | 30 | 30 | 30 | 30 | 30 |
| Ca(OH)$_2$ | 5 | 5 | 5 | 5 | 5 | 5 |
| Hydroquinone | 1.2 | 1.2 | 1.2 | 1.2 | 1.2 | 1.2 |
| Accelerator | 0.5 | 0.27 | 0.33 | 0.39 | 0.34 | 0.41 |
| Thermo-mechanical characteristics | | | | | | |
| O.D.R. 170°C torque inch./lbs minutes 2.5 | 5.5 | 6 | 11 | 6 | 5 | 4 |
| " 5 | 9.5 | 10 | 48 | 47 | 20 | 6 |
| " 7.5 | 16 | 20 | 68 | 72 | 38 | 50 |
| " 10 | 21 | 29 | 76 | 86 | 52 | 98 |
| " 15 | 65 | 60 | 82 | 106 | 83 | 108 |
| " 20 | 80 | 80 | 86 | 112 | 98 | 112 |
| " 30 | 106 | 102 | 98 | 118 | 107 | 118 |

TABLE B-continued

| Components of the blend | (3) | (5) | (6) | (7) | (8) | (9) |
|---|---|---|---|---|---|---|
| Viscosity | | | | | | |
| Mooney MS at 121°C minimum | 36 | 29 | 31 | 27 | 29 | 28 |
| minutes for 10 points increase | 37 | 43 | 48 | 44 | 40 | 52 |
| Curing press 170°C × 10' oven 250°C × 16 hours | | | | | | |
| 100% elongation modulus kg/cm$^2$ | 56 | 48 | 50 | 43 | 38 | 46 |
| Tensile stress kg/cm$^2$ | 135 | 140 | 145 | 120 | 115 | 156 |
| Elongation at break, % | 185 | 195 | 190 | 180 | 195 | 200 |
| Hardness, IRHD | 69 | 68.5 | 69 | 68 | 67 | 69 |
| Compression set, O-Rings ($\phi$25.4 × 3.53 mm) | | | | | | |
| 200°C × 70 hours | 20 | 19 | 24 | 17 | 15 | 13 |
| 200°C × 168 hours | 33 | 34 | 39 | 26 | 23 | 19 |

EXAMPLE 3

Example 2 was repeated but starting from a fluorinated elastomeric copolymer containing 75 mol % of vinylidene fluoride and 25 mol % of hexafluoropropene, using hydroquinone as curing agent and the following compounds as accelerators:

| Run No. | Type of accelerator |
|---|---|
| (10) | $[CH_3O-N(CH_3)(CH_3)-C_{12}H_{25}]^+ \; I^-$ |
| (11) | $[C_2H_5O-N(C_6H_{11})(C_6H_{11})-C_6H_{11}]^+ \; I^-$ |
| (12) | $[CH_3O-N(C_8H_{17})(C_8H_{17})-C_8H_{17}]^+ \; I^-$ |
| (13) | $[CH_3O,\; CH_3O\;CH_2-CH_2OCH_2-CH_2,\; N,\; CH_2-CH_2-C_6H_{11},\; CH_2-CH_2-C_6H_{11}]^+ \; I^-$ |
| (14) | $[CH_3O,\; O-C_6H_4-CH_2-CH_2,\; N,\; CH_2-CH_2-C_6H_4-O,\; CH_2-CH_2-C_6H_4-O]^+ \; I^-$ |
| (15) | $[CH_3O(CH_3)(CH_3)N-CH_2-CH_2-CH_2-CH_2-N(CH_3)(CH_3)OCH_3]^{++} \; 2\,I^-$ |

These compounds were used in a quantity corresponding to 0.00112 mol.

The results obtained by curing the blends of runs (10) – (15) are summarized in the following Table C.

EXAMPLE 4

Example 2 was repeated but starting from a fluorinated elastomeric copolymer containing 60 mol % of vinylidene fluoride, 20 mol % of tetrafluoroethylene and 20 mol % of 1-hydropentafluoropropene using hydroquinone as curing agent and the following compounds as accelerators. Run No.

(16) $\left[\begin{array}{c} CH_3O \\ C_8H_{17} \end{array} N \begin{array}{c} C_8H_{17} \\ C_8H_{17} \end{array}\right]^{++}_2$ [OOC—COO]$^{--}$ (oxalate)

(17) $\left[\begin{array}{c} CH_3O \\ C_8H_{17} \end{array} N \begin{array}{c} C_8H_{17} \\ C_8H_{17} \end{array}\right]^{+}$ [OOC—CH$_3$]$^-$ (acetate)

(18) $\left[\begin{array}{c} CH_3O \\ C_8H_{17} \end{array} N \begin{array}{c} C_8H_{17} \\ C_8H_{17} \end{array}\right]^{+}$ [OOC—C$_{17}$H$_{35}$]$^-$ (stearate)

Said compounds were used in a quantity corresponding to 0.0010 mol.

The results obtained in curing the blends of runs (16) – (18) are summarized in the following Table C.

EXAMPLE 5

Example 2 was repeated but starting from a fluorinated elastomeric copolymer containing 70 mols % of vinylidene fluoride and 30 mols % of 1-hydropentafluoropropene using

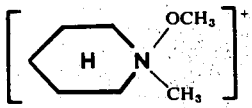

in a quantity corresponding to 0.00137 mol (0.5 parts by weight) as accelerator and as curing agent one of the following compounds:

| Run No. | Type of curing agent |
|---|---|
| (19) | Resorcine |
| (20) | bis-phenol A |
| (21) | bis-phenol AF |
| (22) | 1,5-naphthalendithiol |

Said compounds are used in a quantity corresponding to 0.0011 mol.

The results obtained in curing the mixes of runs (19) – (22) are summarized in the following Table C.

EXAMPLE 6

Examle 2 was repeated, but starting from a fluorinated elastomeric terpolymer containing 65 mol % of vinylidene fluoride, 15 mol % of tetrafluoroethylene and 20 mol % of hexafluoropropene, using the following compounds as accelerating and curing agents.

| Run No. | Type of accelerator | Type of curing agent |
|---|---|---|
| (23) | $\left[CH_3O-P \begin{array}{c} C_4H_9 \\ -C_4H_9 \\ C_4H_9 \end{array}\right]^+ I^-$ 0.0015 mol | bis-phenol A 0.01 mol |
| (24) | $\left[CH_3O-P \begin{array}{c} C_4H_9 \\ -C_4H_9 \\ C_4H_9 \end{array}\right]^+$ [OOC—CH$_2$—CH$_3$ (propionate)]$^-$ 0.0012 mol | 1,5—naphthalene dithiol 0.01 mol |

The results obtained in curing the blends of runs (23) and (24) are summarized in the following Table C.

TABLE C

| Components of the blend | (10) | (11) | (12) | (13) | (14) |
|---|---|---|---|---|---|
| Fluorinated elastomer (as indicated) | 100 | 100 | 100 | 100 | 100 |
| Magnesium oxide | 5 | 5 | 5 | 5 | 5 |
| Carbon black MT | 30 | 30 | 30 | 30 | 30 |
| Ca(OH)$_2$ | 5 | 5 | 5 | 5 | 5 |
| Curing agent (as indicated) | 1 | 1 | 1 | 1 | 1 |
| Accelerator (as indicated) | 0.39 | 0.48 | 0.56 | 0.52 | 0.54 |
| Thermo-mechanical characteristics | | | | | |
| O.D.R. 170°C torque inch./lbs minutes 2.5 | 7.5 | 6 | 13 | 4 | 4 |
| " 5 | 22.5 | 34 | 41 | 6 | 5.5 |
| " 7.5 | 41 | 58 | 69 | 12 | 8.5 |
| " 10 | 54.5 | 71 | 83 | 38 | 12 |
| " 15 | 72 | 86 | 101 | 57 | 21 |
| " 20 | 88 | 104 | 116 | 76 | 38 |
| " 30 | 93 | 116 | 118 | 82 | 53 |
| Viscosity Mooney MS at 121°C minimum | 34 | 31 | 29 | 33 | 28 |
| minutes for 10 points increase | 43 | 39 | 45 | 51 | 54 |
| Curing press 170°C × 10' oven 150° C × 16 hours | | | | | |
| 100% elongation modulus kg/cm$^2$ | 43 | 51 | 60 | 35 | 31 |
| Tensile stress kg/cm$^2$ | 125 | 135 | 140 | 135 | 125 |
| Elongation at break % | 215 | 195 | 185 | 225 | 230 |
| Hardness, IRHD | 70 | 69 | 69 | 70 | 67 |
| Compression set, O-Rings (φ 25.4 × 3.53 mm) 200°C × 70 hours | 23 | 25 | 19 | 21 | 18 |
| 200°C × 168 hours | 38 | 37.5 | 29 | 33 | 29 |

| Components of the blend | (15) | (16) | (17) | (18) | (19) |
|---|---|---|---|---|---|
| Fluorinated elastomer (as indicated) | 100 | 100 | 100 | 100 | 100 |
| Magnesium oxide | 5 | 5 | 5 | 5 | 5 |
| Carbon black MT | 30 | 30 | 30 | 30 | 30 |
| Ca(OH)$_2$ | 5 | 5 | 5 | 5 | 5 |
| Curing agent (as indicated) | 1 | 1 | 1 | 1 | 4 |
| Accelerator (as indicated) | 0.47 | 0.65 | 0.42 | 0.58 | 0.5 |
| Thermo-mechanical characteristics | | | | | |
| O.D.R. 170°C torque inch./lbs minutes 2.5 | 9 | 9 | 3 | 12 | 3 |

TABLE C-continued

| Components of the blend | | (10) | (11) | (12) | (13) | (14) |
|---|---|---|---|---|---|---|
| " | 5 | 35 | 38 | 6 | 39 | 7.5 |
| " | 7.5 | 56 | 46 | 15 | 58 | 15 |
| " | 10 | 83 | 68 | 29 | 71 | 29 |
| " | 15 | 108 | 89 | 41 | 90 | 41 |
| " | 20 | 121 | 115 | 67 | 115 | 58 |
| " | 30 | 128 | 123 | 81 | 128 | 72 |
| Viscosity | | | | | | |
| Mooney MS at 121°C | | | | | | |
| minimum | | 30 | 29 | 34 | 26 | 31 |
| minutes for 10 points increase | | 36 | 45 | 41 | 32 | 43 |
| Curing | | | | | | |
| press 170°C × 10' | | | | | | |
| oven 150°C × 16 hours | | | | | | |
| 100% elongation modulus kg/cm² | | 71 | 43 | 71 | 38 | 48 |
| Tensile stress kg/cm² | | 155 | 175 | 125 | 115 | 155 |
| Elongation at break % | | 175 | 195 | 68 | 210 | 205 |
| Hardness, IRHD | | 74 | 71 | 75 | 68 | 70 |
| Compression set, O-Rings (φ 25.4 × 3.53 mm) | | | | | | |
| 200°C × 70 hours | | 24 | 18 | 26 | 21 | 21 |
| 200°C × 168 hours | | 31 | 29 | 38 | 34 | 39 |

| Components of the blend | (20) | (21) | (22) | (23) | (24) |
|---|---|---|---|---|---|
| Fluorinated elastomer (as indicated) | 100 | 100 | 100 | 100 | 100 |
| Magnesium oxide | 5 | 5 | 5 | 5 | 5 |
| Carbon black MT | 30 | 30 | 30 | 30 | 30 |
| Ca(OH)₂ | 5 | 5 | 5 | 5 | 5 |
| Curing agent (as indicated) | 2 | 3.6 | 4.2 | 2 | 4.2 |
| Accelerator (as indicated) | 0.5 | 0.5 | 0.5 | 0.52 | 0.47 |
| Thermo-mechanical characteristics | | | | | |
| O.D.R. 170°C torque inch./lbs | | | | | |
| minutes 2.5 | 6 | 3 | 8 | 4.5 | 6 |
| " 5 | 21 | 12 | 31 | 11 | 21 |
| " 7.5 | 38 | 43 | 51 | 20 | 48 |
| " 10 | 46 | 69 | 83 | 36 | 63 |
| " 15 | 61 | 91 | 95 | 48 | 84 |
| " 20 | 79 | 115 | 124 | 57 | 95 |
| " 30 | 93 | 126 | 126 | 71 | 106 |
| Viscosity | | | | | |
| Mooney MS at 121°C minimum | 28 | 36 | 33 | 34 | 31 |
| minutes for 10 points increase | 46 | 39 | 36 | 56 | 51 |
| Curing | | | | | |
| press 170°C × 10' | | | | | |
| oven 150°C × 16 hours | | | | | |
| 100% elongation modulus kg/cm² | 51 | 73 | 85 | 38 | 40 |
| Tensile stress kg/cm² | 135 | 165 | 150 | 110 | 95 |
| Elongation at break % | 195 | 185 | 155 | 165 | 145 |
| Hardness, IRHD | 69 | 72 | 76 | 71 | 76 |
| Compression set, O-Rings (φ 25.4 × 3.53 mm) | | | | | |
| 200°C × 70 hours | 16 | 9 | 24 | 28 | 26 |
| 200°C × 168 hours | 30 | 19 | 38 | 40 | 41 |

EXAMPLE 7

Curable compositions, made up of an elastomeric fluorinated copolymer of the type indicated in Example 3 and containing N-methoxy N-methyl-piperidinium iodide as accelerator and different curing agents based on phenolic compounds, and more particularly:

| Run No. | |
|---|---|
| 25 | 2-4-dihydroxybenzophenone |
| 26 | bis-phenol A |
| 27 | monopotassic salt of bis-phenol AF |
| 28 | dipotassic salt of bis-phenol AF |
| 29 | mono-potassic salt of 2,4,4' trihydroxybenzophenone | were vulcanized under the conditions of the previous examples. The results thus obtained are summarized in the following Table D.

EXAMPLE 8

Example 1 was repeated, but using bis-phenol A as curing agent. The results of this test (Run 30) are summarized in the following Table D.

EXAMPLE 9

A blend made up of

| | Parts by weight |
|---|---|
| Fluorinated elastomer of Example 3 | 100 |
| MgO (Maglite D) | 5 |
| Carbon black MT | 30 |
| Ca(OH)₂ | 5 |
| Monopotassic salt of bis-phenol AF | 1.83 |
| N-methoxy-N-methyl piperidinium iodide | 0.45 | was vulcanized, by molding in a press at 170°C for 10 minutes, on six steel specimens of 60 × 2.54 × 1 mm. The molding was carried out according to ASTM D 429/Method B.

Before the vulcanization thereon of the fluorinated elastomeric composition, the specimens underwent the following treatments:

degreasing with a chlorinated solvent; ($C_2HCl_3$)
evaporation of the solvent at room temperature for 10 minutes;
sanding of the degreased specimen by means of red corundum (120 mesh) with compressed air (6 atm.);
further degreasing with the chlorinated solvent of the sanded specimen;
applying a layer of an adhesive (Chemosil 510); and finally
drying of the adhesive at 40°C for 20 minutes.

Two of these specimens were tested to determine the adhesion between the metallic surface and the fluorinated elastomer vulcanized thereon according to the peeling test method, by using an Amsler horizontal dynamometer.

The adhesion strength was respectively 9.5 Kg/cm and 10.2 Kg/cm. Two other specimens were post-vulcanized in oven at 250°C for 8 hours, with a gradual increase of temperature from 100°C to 250°C.

The adhesion strength still determined according to the peeling test method with an angle of 90°C, was respectively 7.7 and 8.1 Kg/cm. The remaining two specimens were post-vulcanized as above described and, in addition, subjected to a further thermal treatment at 260°C for 120 hours. The adhesion strength was respectively 4.4 and 4.6 Kg/cm.

These data show the exceptional adhesion to metallic substrates of the vulcanized fluorinated elastomeric compositions according to this invention even after prolonged theremal treatments. It must be noted however that in any case the layer of elastomer vulcanized onto the steel specimen, when subjected to the peeling test, always broke before being detached from the metallic surface of the steel specimen, thus indicating that the actual adhesion strength was even greater than that ascertained with the peeling test.

TABLE D

| Components of the blend | (25) | (26) | (27) | (28) | (29) | (30) |
|---|---|---|---|---|---|---|
| Fluorinated elastomer (as indicated) | 100 | 100 | 100 | 100 | 100 | 100 |
| Magnesium oxide | 5 | 5 | 5 | 5 | 5 | 5 |
| Carbon black MT | 30 | 30 | 30 | 30 | 30 | 30 |
| Ca(OH)$_2$ | 5 | 5 | 5 | 5 | 5 | 5 |
| Curing agent (as indicated) | 2 | 2.35 | 1.83 | 1.65 | 1.9 | 2.2 |
| N-methoxy-N-methyl piperidinium iodide | 0.38 | 0.41 | 0.45 | 0.45 | 0.40 | 0.4 |
| Viscosity | | | | | | |
| Mooney MS at 121°C | | | | | | |
| minimum | 56 | 54 | 54 | 56 | 49 | 29 |
| minutes for 10 points increase | 41 | 39 | 36 | 42 | 33 | 31 |
| Curing | | | | | | |
| press 170 C × 10' oven 150 C × 16 hours | | | | | | |
| 100% elongation modulus Kg/cm² | 63 | 83 | 56 | 95 | 41 | 76 |
| Tensile stress Kg/cm² | 155 | 160 | 175 | 135 | 165 | 145 |
| Elongation at break % | 215 | 165 | 200 | 155 | 230 | 170 |
| Hardness, IRHD | 68.5 | 74 | 70 | 76 | 69 | 75 |
| Compression set, O-Rings (φ 25.4 × 3.53 mm) | | | | | | |
| 200°C × 70 hours | 30 | 35 | 20 | 32 | 28 | 32 |
| 200°C × 168 hours | 48 | 49 | 31 | 44 | 38 | 49 |

We claim:

1. Curable compositions comprising

I. 100 parts by weight of at least one saturated, elastomieric copolymer of vinylidene fluoride with at least one fluorinated or chloro-fluorinated, ethylenically unsaturated monomer copolymerizable therewith;

II. 1–40 parts by weight of an inorganic acids acceptor consisting of at least one substance selected from the group consisting of magnesium oxide, calcium oxide, lead monoxide, zinc oxide, lead basic phosphite and cationic complexes and chelates thereof;

III. 0.5–10 parts by weight of at least one basic compound selected from the group consisting of alkaline earth - metal hydroxides and metal salts of weak acids, and cationic complexes and chelates thereof;

IV. 0.5–15 parts by weight of curing agent; and

V. 0.05–5 parts by weight of at least one curing accelerator, said curable compositions being characterized in that the curing agent is selected from the group consisting of hydroquinone, resorcinol, catechol, naphthols, bisphenols, their derivatives containing substances other than hydrogen in the aromatic ring, the aliphatic group, or both; aliphatic and cycloaliphatic diols; dialkylene aromatic diols, the corresponding thiol derivatives and alkali metal salts thereof; and in that the curing accelerator, used in combination therewith is a hydrate or salt of the cations:

A) 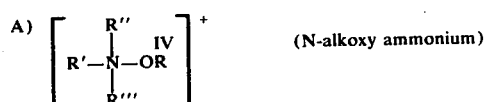 (N-alkoxy ammonium)

B) 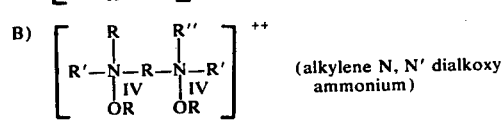 (alkylene N, N' dialkoxy ammonium)

C) 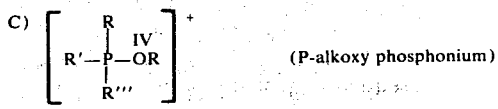 (P-alkoxy phosphonium)

wherein R', R'' and R''' which may be the same or different are selected from the group consisting of alkyl, cycloalkyl, aryl, alkylenaryl, oxyalkyl, and polyoxyalkyl groups with the OH end group either free or etherified, containing from 1 to 18 carbon atoms; —CH=groups which are part of aromatic or heteroaromatic rings; —CH= groups which are part of cycloaliphatic or heterocycloaliphatic rings; and —CH$_2$ groups which are part of cycloaliphatic or heterocycloaliphatic rings; R$^{IV}$ is selected from the group consisting of hydrogen, alkyl, oxyalkyl and polyoxyalkyl groups in which the —OH end group is either free or etherified; and wherein R is selected from the group consisting of alkylene, cycloalkylene and dialkylene cycloalkyl groups containing from 2 to 18 carbon atoms and dialkylarylene groups containing from 8 to 12 carbon atoms, with organic and inorganic anions.

2. Curable compositions according to claim 1, characterized in containing 100 parts by weight of the vinylidene fluoride elastomeric copolymer, 2–10 parts by weight of the inorganic acids acceptors, 3–7 parts by weight of the basic compounds, 1–6 parts by weight of the curing agents, and 0.1–1.2 parts by weight of the accelerators.

3. Process for curing the compositions of claim 1, characterized in that said compositions are first heated under pressure at a temperature ranging from 130° to 200°C, for a time comprised between 1 and 60, minutes, and are subsequently heated in a furnace or oven under atmospheric pressure and at temperatures ranging from 130° to 315°C, for a time comprised between 5 and 48 hours.

4. Cured compositions obtained by the process of claim 3.

5. Manufactured molded articles of the compositions of claim 4.

6. Seals, both static and dynamic, protective clothing for contact with strong chemical agents and protecting sheaths for electric cables exposed to intense thermal radiation comprising as the essential component thereof, a cured composition of claim 4.

7. O-Ring shaped seals (diameter 25.4 mm - max. thickness 3.54 mm) consisting of a cured composition according to claim 4, and having a compression-set figure of 10% after 72 hours at 200°C.

8. Curable compositions according to claim 1, in which the copolymer (I) is a copolymer of vinylidene fluoride with a monomer selected from the group consisting of:
1- hydropentafluoropropene;
2- hydropentafluoropropene;
1,1 - dihydrotetrafluoropropene;
hexafluoropropene;
tetrafluoroethylene; and
trifluorochloroethylene.

9. Curable compositions according to claim 1, in which the anions are halides, oxalates, formiates, stearates, or benzoates.

10. Curable compositions according to claim 1 wherein the derivative of hydroquinone, resorcinol, catechol, naphthols, or bisphenols is one in which the substituents in the aromatic ring or in the aliphatic group are chlorine or fluorine.

11. The process according to claim 3, in which said compositions are first heated under pressure at a temperature of from 160° to 200°C for from 1 to 20 minutes, and are subsequently heated in a furnace or oven under atmospheric pressure and at a temperature of from 200° to 275°C for 10 to 24 hours.

* * * * *

UNITED STATES PATENT OFFICE
CERTIFICATE OF CORRECTION

Patent No. 3,920,620   Dated November 18, 1975

Inventor(s) Giovanni CECCATO et al

It is certified that error appears in the above-identified patent and that said Letters Patent are hereby corrected as shown below:

Col. 2, last line,   "-$CM_2$-" should be

- - -   -$CH_2$-   - - -.

Col. 6, line 11, (line 8 of TABLE A),

"Iodine" should be - - - Iodide - - -.

Col. 11, in the heading of TABLE C - continued, the figures "(10)   (11)   (12)   (13)

and (14)" should be - - -

(15)   (16)   (17)   (18) and (19) - - -, respectively.

Signed and Sealed this

Seventh Day of March 1978

[SEAL]

Attest:

RUTH C. MASON   LUTRELLE F. PARKER
Attesting Officer   Acting Commissioner of Patents and Trademarks